US011177725B2

(12) United States Patent
Yoshinaga et al.

(10) Patent No.: US 11,177,725 B2
(45) Date of Patent: Nov. 16, 2021

(54) INTERIOR PERMANENT-MAGNET MOTOR AND METHOD FOR MANUFACTURING THE SAME

(71) Applicant: TOYOTA JIDOSHA KABUSHIKI KAISHA, Toyota (JP)

(72) Inventors: Fumitaka Yoshinaga, Toyota (JP); Akira Yamashita, Toyota (JP); Airi Kamimura, Toyota (JP); Kazuaki Haga, Toyota (JP); Kensuke Komori, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 182 days.

(21) Appl. No.: 16/431,982

(22) Filed: Jun. 5, 2019

(65) Prior Publication Data

US 2019/0386548 A1    Dec. 19, 2019

(30) Foreign Application Priority Data

Jun. 19, 2018    (JP) .............................. JP2018-116478
Mar. 6, 2019    (JP) .............................. JP2019-040557

(51) Int. Cl.
*H02K 15/03*    (2006.01)
*H02K 1/27*    (2006.01)

(52) U.S. Cl.
CPC ............. *H02K 15/03* (2013.01); *H02K 1/276* (2013.01)

(58) Field of Classification Search
CPC .......... H02K 15/03; H02K 1/02; H02K 1/276; H02K 1/2766; H01F 3/04; H01F 41/0226; H01F 41/00; H01F 1/16; H01F 1/15333; C21D 1/26; B21D 28/34
See application file for complete search history.

(56) References Cited

U.S. PATENT DOCUMENTS

| 2011/0000079 | A1* | 1/2011 | Fukumaru | H02K 1/2766 29/598 |
| 2018/0278100 | A1* | 9/2018 | Zhu | H02K 1/2766 |
| 2019/0207441 | A1* | 7/2019 | Takeuchi | H02K 1/22 |

FOREIGN PATENT DOCUMENTS

| JP | 5493405 B2 | 5/2014 |
| JP | 2015-27150 A | 2/2015 |
| JP | 2017-147810 A | 8/2017 |

* cited by examiner

*Primary Examiner* — Tulsidas C Patel
*Assistant Examiner* — Riley Owen Stout
(74) *Attorney, Agent, or Firm* — Oliff PLC (57) ABSTRACT

Provided is an IPM motor that is strong and has high output. An IPM motor has a rotor that includes a rotor core as a laminate of a plurality of metal foil pieces made of a soft magnetic material that are stacked in a direction of a rotation axis of the rotor. The rotor core has a plurality of through-holes that penetrates through the rotor core in the direction of the rotation axis, the plurality of through-holes including through-holes embedding magnets. The rotor core includes inner bridges and outer bridges. At least one of the inner bridges and the outer bridges of the rotor core is made of an amorphous soft magnetic material, and other parts are made of a nanocrystal soft magnetic material.

6 Claims, 7 Drawing Sheets

INTERIOR PERMANENT-MAGNET MOTOR AND METHOD FOR MANUFACTURING THE SAME

CROSS REFERENCE TO RELATED APPLICATIONS

The present application claims priority from Japanese patent application JP 2018-116478 filed on Jun. 19, 2018 and Japanese patent application JP 2019-040557 filed on Mar. 6, 2019, the content of which is hereby incorporated by reference into this application.

BACKGROUND

Technical Field

The present disclosure relates to interior permanent-magnet motors including a stator having a coil wound therearound and a rotor disposed around a rotary shaft, the rotor being rotatable relative to the stator, and relates to methods for manufacturing such an interior permanent-magnet motor.

Background Art

Conventional motors include a stator having a coil wound therearound and a rotor disposed around a rotary shaft, the rotor being rotatable relative to the stator. Among these motors, an interior permanent-magnet (IPM) motor includes a rotor core having a rotary shaft inserted, and the rotor core has through-holes that penetrate through the rotor core in the axial direction. Such a motor has magnets in the through-holes, and each of the magnets is embedded in a slot with a sealant, such as epoxy resin (see JP 2017-147810 A, for example).

Such through-holes define inner bridges and outer bridges in the rotor core. The inner bridges extend between adjacent through-holes. The outer bridges are located between the through-holes close to the outer periphery of the rotor and the outer circumference of the rotor. These inner bridges and outer bridges have a mechanical strength lower than at other parts of the rotor core. JP 2015-27150 A, for example, discloses a technique of depressing these bridges (inner bridges and outer bridges) to be plastic-deformed and so work-hardening these bridges.

SUMMARY

The above-stated through-holes in the rotor core are formed to reduce the excessive flow of magnetic flux from the embedded magnets into the bridges and to flow the magnetic flux from the magnets toward the stator mainly at parts other than the bridges. This improves the output characteristics of the motor.

The motor of JP 2015-27150 A has bridges having an improved mechanical strength due to work-hardening of the bridges. Such bridges, however, have the same magnetic characteristics as those of other parts, and the motor therefore has difficulty to improve the output characteristics. This motor has another problem that plastic deformation during manufacturing may damage the bridges.

In view of these problems, the present disclosure provides an IPM motor that is strong and has high output as well as a method for manufacturing such a motor stably.

In view of the above problems, an interior permanent-magnet motor (hereinafter called a motor) according to the present disclosure includes: a stator having a coil wound therearound, and a rotor rotatably disposed inside of the stator. The rotor includes a rotor core that is a laminate of a plurality of pieces of metal foil made of a soft magnetic material that are stacked in a direction of a rotation axis of the rotor, the rotor core has a plurality of through-holes that penetrates through the rotor core in the direction of the rotation axis, the plurality of through-holes including through-holes embedding magnets, the rotor core has inner bridges and outer bridges, the inner bridges extending between the through-holes that are adjacent to each other, the outer bridges being located between the through-holes close to an outer circumference of the rotor core and the outer circumference of the rotor core, and at least one of the inner bridges and the outer bridges in the rotor core includes an amorphous soft magnetic material, and the other parts of the rotor core include a nanocrystal soft magnetic material.

The bridges of rotor cores have structurally a lower strength than the other parts. The bridges of the rotor core of the present disclosure are made of an amorphous soft magnetic material that is stronger than a nanocrystal soft magnetic material, and so the strength improves. This suppresses damage at the bridges when the rotor rotates at a high speed, and so the durability of the rotor improves. Amorphous soft magnetic materials have saturated magnetization lower than that of nanocrystal soft magnetic materials. Magnetic flux from a magnet therefore easily flows to the stator through the parts other than the bridges, and the output characteristics of the motor improve.

At least one of the bridges including the inner bridges and the outer bridges in the rotor core may include an amorphous soft magnetic material. In some embodiments, the outer bridges are made of an amorphous soft magnetic material. That is, the motor in this aspect may include the outer bridges made of an amorphous soft magnetic material, and the inner bridges may be made of any one of an amorphous soft magnetic material and a nanocrystal soft magnetic material.

During the driving of the motor, the stator having a coil wound therearound generates heat, and the generated heat heats the outer circumference of the rotor (specifically the rotor core) as well. The outer bridges in this aspect are made of an amorphous soft magnetic material, and amorphous soft magnetic materials decrease in saturated magnetic flux density more than nanocrystal soft magnetic materials with increase in temperature. This configuration of the motor limits the flow of magnetic flux through the outer bridges when the temperature of the outer circumference of the rotor core increases to a high-temperature range during the driving of the motor, and the magnetic flux flows more at the parts other than the outer bridges toward the stator. This suppresses a decrease in the output of the motor even when the temperature of the rotor core reaches a high-temperature range.

A method for manufacturing a motor according to the present disclosure manufactures an interior permanent-magnet motor including: a stator having a coil wound therearound, and a rotor rotatably disposed inside of the stator. The method includes: preparing metal foil pieces each made of an amorphous soft magnetic material and having a shape corresponding to a shape of a rotor core of the rotor, the metal foil piece having a plurality of through holes including through-holes to embed magnets; selecting at least one of inner bridges and outer bridges from each of the prepared metal foil pieces, the inner bridges extending between the through-holes that are adjacent to each other, the outer bridges being located between the through-holes close to an outer circumference of the metal foil piece and the outer circumference of the metal foil piece, and heating parts other than the selected bridges to alter the heated parts from the amorphous soft magnetic material to a nanocrystal soft magnetic material while keeping the selected bridges as the amorphous soft magnetic material; and stacking the altered metal foil pieces in a direction of a rotation axis of the rotor, and embedding magnets in the corresponding through-holes to manufacture the rotor core.

A rotor core is structurally weak at the bridges. The method of the present disclosure keeps the bridges of the rotor core as the amorphous soft magnetic material that is stronger than nanocrystal soft magnetic materials, and so the strength at the bridges improves. Local heating process alters parts other than the bridges into a nanocrystal soft magnetic material, and so can increase the strength of the bridges easily without plastic-deforming of the bridges. The strength of the bridges improves in this way. This avoids damage of the bridges, such as deformation, due to a contact with magnets when the method stacks the metal foil pieces or embeds the magnets.

The bridges having such an improved strength have less damage when the rotor including the bridges rotates at a high speed, and so the durability of the rotor improves. Amorphous soft magnetic materials have saturated magnetization lower than that of nanocrystal soft magnetic materials. Magnetic flux from a magnet therefore easily flows to the stator through the parts other than the bridges, and the output characteristics of the motor improve.

The method may select any one of the bridges including the inner bridges and the outer bridges before the step of altering the heated parts from the amorphous soft magnetic material to the nanocrystal soft magnetic material as long as the selected bridges are kept as the amorphous soft magnetic material. In some embodiments, the selected bridges before the altering step are the outer bridges. That is, the altering step of the method in this aspect keeps the outer bridges as the amorphous soft magnetic material and does not alter the outer bridges to a nanocrystal soft magnetic material.

During the driving of the motor, the stator having a coil wound therearound generates heat, and the generated heat heats the outer circumference of the rotor (specifically the rotor core) as well. The outer bridges of the rotor core of the manufactured motor in this aspect are made of an amorphous soft magnetic material, and amorphous soft magnetic materials decrease in saturated magnetic flux density more than nanocrystal soft magnetic materials with increase in temperature. Such a motor limits the flow of magnetic flux through the outer bridges when the temperature of the outer circumference of the rotor core increases to a high-temperature range during the driving of the motor, and the magnetic flux flows more at the parts other than the outer bridges toward the stator. This suppresses a decrease in the output of the motor even when the temperature of the rotor core reaches a high-temperature range.

The motor according to the present disclosure improves the strength while improving the output. The method for manufacturing a motor according to the present disclosure enables easy manufacturing of a motor having such characteristics.

DETAILED DESCRIPTION

The following describes an IPM motor and a method for manufacturing the motor according to the present disclosure, with reference to the drawings.

1. IPM Motor 1

Figure 1:
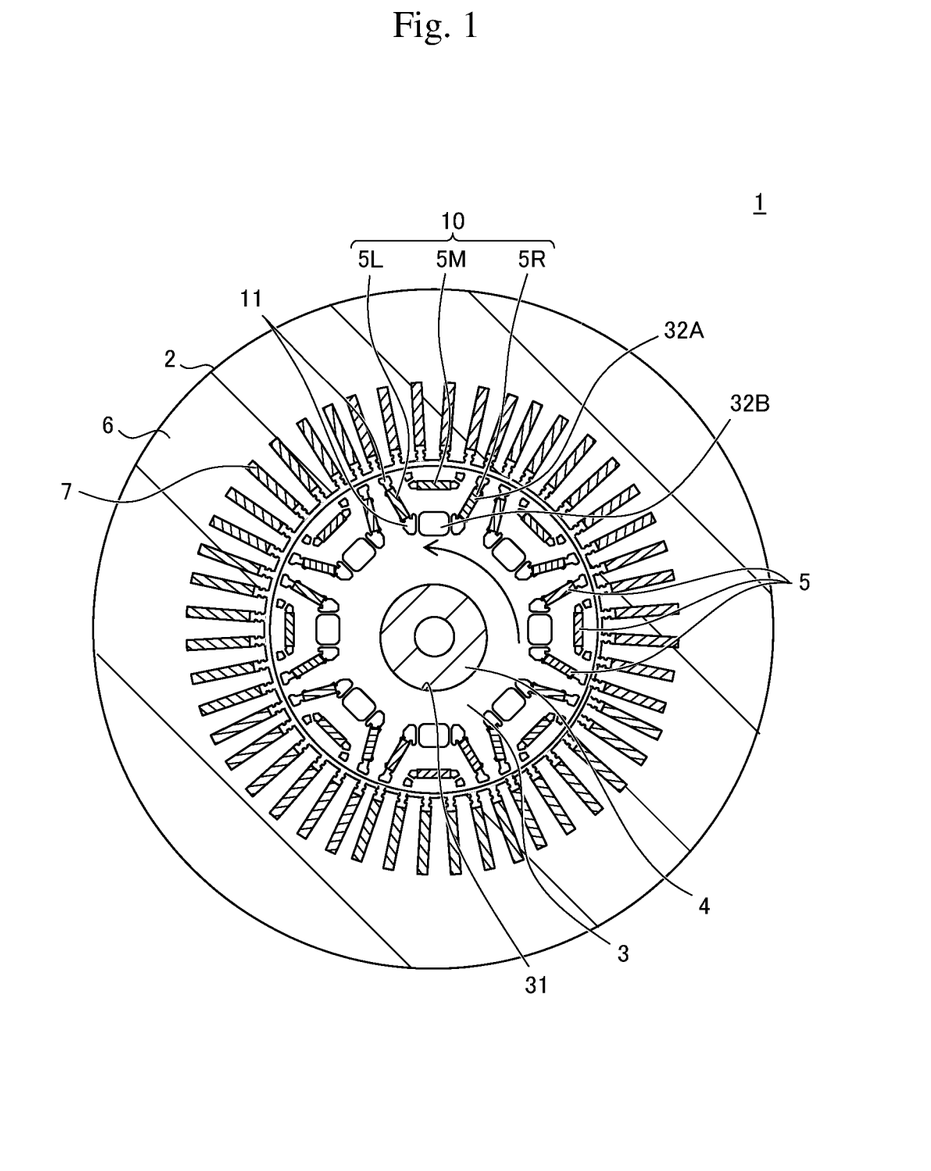
FIG. 1 is a plan view of an IPM motor according to one embodiment.
Figure 2:
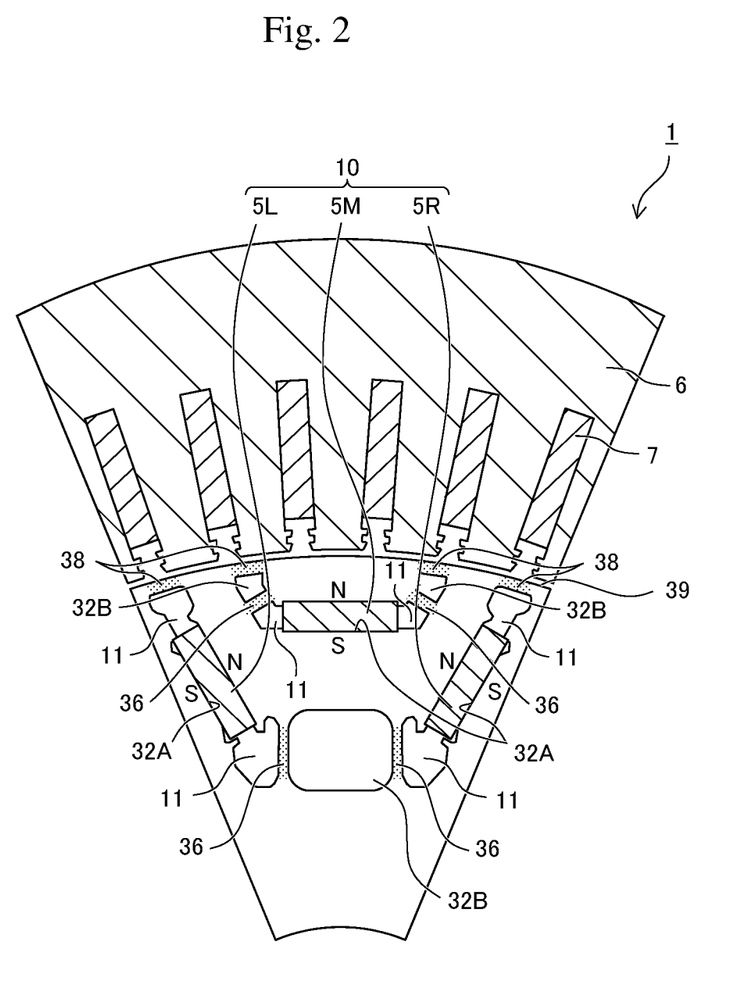
FIG. 2 is an enlarged plan view of a ⅛ model of the IPM motor 1 of FIG. 1.
Figure 3:
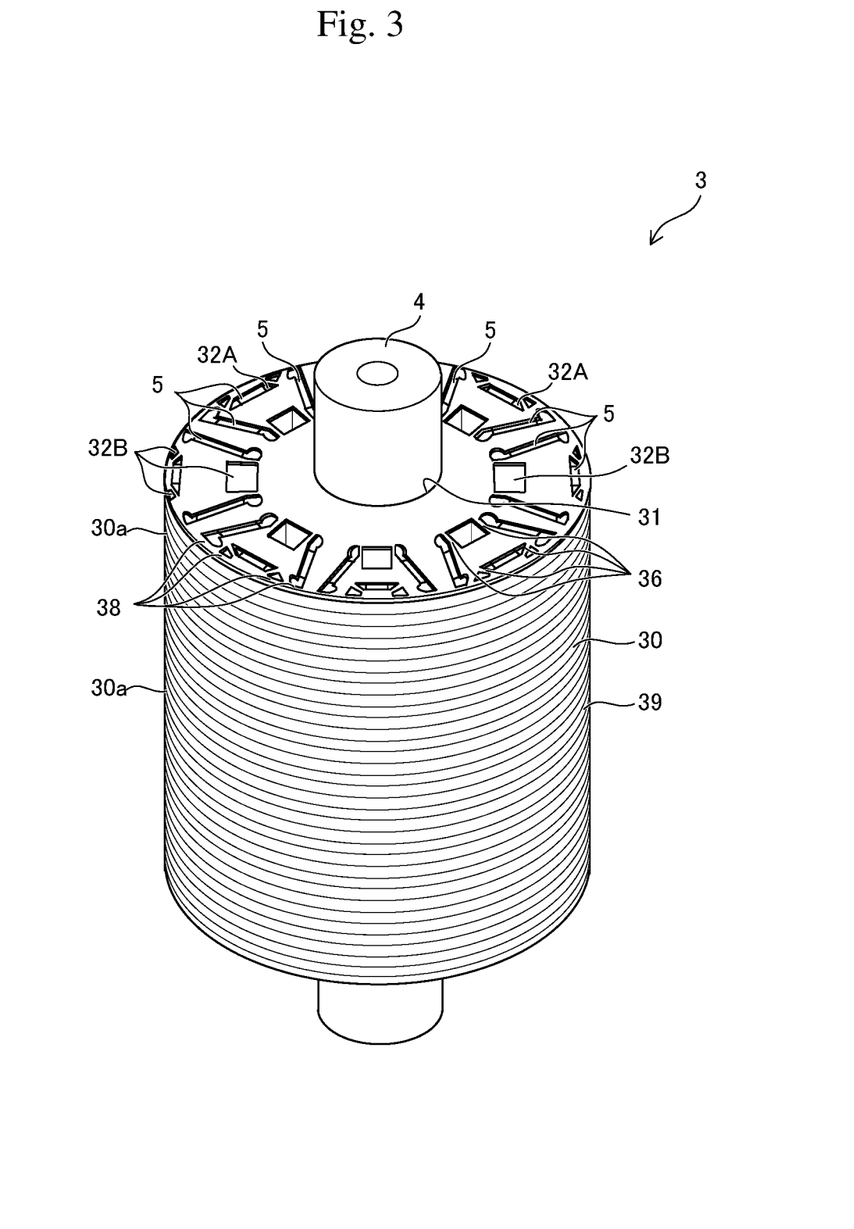
FIG. 3 is a schematic perspective view of a rotor in FIG. 1.

FIG. 1 is a plan view of an IPM motor 1 according to one embodiment. FIG. 2 is an enlarged plan view of a ⅛ model of the IPM motor 1 of FIG. 1. FIG. 3 is a schematic perspective view of a rotor 3 in FIG. 1.

The IPM motor (hereinafter called motor) 1 operates as a drive source of a hybrid vehicle or an electric vehicle, for example, and includes a stator 2 having a coil 7 wound therearound, and a rotor 3 rotatably disposed inside of the stator 2.

The stator 2 includes an annular iron core 6 including magnetic steel sheets or a nanocrystal soft magnetic material described later, and a plurality of coils 7 wound around the iron core 6. The coils 7 are disposed in the form of concentrated winding or distributed winding and on the inner periphery of the stator 2 at regular intervals. Current flowing through the coils 7 generates rotating magnetic field to rotate the rotor 3.

The rotor 3 includes a rotor core 30, a rotary shaft 4 inserted into a shaft hole 31 at a center of the rotor core 30, and a plurality of magnets 5 (5L, 5M, 5R) embedded in a plurality of through-holes 32A in the rotor core 30. The rotary shaft 4 is made of metal. The rotary shaft 4 is inserted into the shaft hole 31 of the rotor core 30, and then is fixed to the rotor core 30 by caulking, for example.

Each magnet 5 is a permanent magnet, and has a cuboid shape. The magnet 5 has a rectangular lateral face having long sides and short sides. As shown in FIG. 1, these magnets 5 are disposed in accordance with a predetermined rule along the rotating direction of the rotor 3 (the direction of the arrow in FIG. 1). Specifically as shown in FIG. 2, magnet groups 10 each consisting of a left magnet 5L, a middle magnet 5M, and a right magnet 5R are disposed at the 45° intervals along the rotating direction of the rotor 3. Each magnet 5 is the left magnet 5L, the middle magnet 5M, or the right magnet 5R. The left magnet 5L and the right magnet 5R on both sides of the middle magnet 5M refer to the illustrated positions of these magnets 5 for the purpose of illustration. These magnets may include magnets 5 arranged on one side and on the other side of the middle magnet 5M.

In this magnet group 10, the middle magnet 5M has the N-pole on the side adjacent to the stator 2 and the S-pole on the other side. The left magnet 5L and the right magnet 5R are disposed so that they have mutually reversed polarity of the adjacent magnetic poles of the middle magnet 5M. Specifically the left magnet 5L is closer to the S-pole of the middle magnet 5M than the N-pole, and so has the N-pole on the side adjacent to the middle magnet 5M. Similarly, the right magnet 5R is closer to the S-pole of the middle magnet 5M than the N-pole, and so has the N-pole on the side adjacent to the middle magnet 5M.

Each magnet 5 is fitted into a through-hole (magnet slot) 32A in the rotor core 30, and the through-hole is filled with resin 11 on the left and right both ends. For the resin 11, thermosetting resin having excellent formability and heat resistance is used. Examples of the thermosetting resin include epoxy resins and polyimide resins. Examples of the magnets 5 include rear-earth magnets, such as a neodymium magnet mainly containing neodymium, iron, and boron, and a samarium-cobalt magnet mainly containing samarium and cobalt. Other examples include ferrite magnets and alnico magnets.

The rotor core 30 is a laminate of a plurality of pieces of metal foil 30a made of a soft magnetic material that is stacked in the direction of the rotation axis of the rotor 3. The rotor core 30 may include an adhesive layer, such as heat-resistant resin, between the pieces of metal foil 30a. The rotor core may not have such an adhesive layer when it can keep the lamination. Examples of the heat-resistant resin include thermosetting resins. Examples of the thermosetting resins include epoxy resins, polyimide resins, polyamide-imide resins and acrylic resins.

The rotor core 30 has a plurality of through-holes 32A and 32B that penetrates through the rotor core in the direction of the rotation axis of the rotor 3. The through-holes 32A are to embed the magnets 5, and the through-holes 32B are to block a magnetic flux path or to adjust a magnetic flux path.

The rotor core 30 of the present embodiment has inner bridges 36 and outer bridges 38. The inner bridges 36 extend between adjacent through-holes 32A, 32B. The outer bridges 38 are located between the through-hole 32A (32B) close to the outer circumference 39 of the rotor core 30 and the outer circumference 39 of the rotor core 30.

In the rotor core 30, both of the bridges including the inner bridges 36 and the outer bridges 38 are made of an amorphous soft magnetic material, and parts other than the bridges are made of a nanocrystal soft magnetic material.

Examples of the amorphous soft magnetic material and the nanocrystal soft magnetic material include, but are not limited to, a material including at least one type of magnetic metal selected from the group consisting of Fe, Co and Ni and at least one type of non-magnetic metal selected from the group consisting of B, C, P, Al, Si, Ti, V, Cr, Mn, Cu, Y, Zr, Nb, Mo, Hf, Ta and W.

Typical materials of the amorphous soft magnetic material and the nanocrystal soft magnetic material include, but are not limited to, FeCo alloys (e.g., FeCo and FeCoV), FeNi alloys (e.g., FeNi, FeNiMo, FeNiCr, and FeNiSi), FeAl alloys or FeSi alloys (e.g., FeAl, FeAlSi, FeAlSiCr, FeAl-SiTiRu, and FeAlO), FeTa alloys (e.g., FeTa, FeTaC, and FeTaN) and FeZr alloys (e.g., FeZrN). In some embodiments, the Fe alloy includes 80 at % or more of Fe.

Other materials of the amorphous soft magnetic material and the nanocrystal soft magnetic material include Co alloys including Co and at least one type of Zr, Hf, Nb, Ta, Ti and Y. In some embodiment, the Co alloy includes 80 at % or more of Co. Such a Co alloy easily forms amorphous in the film, which has less crystal magnetic anisotropy, less crystal defects and less grain boundary, and so shows a very excellent soft magnetic property. In some embodiments, the amorphous soft magnetic material may be CoZr, CoZrNb, or CoZrTa alloys.

The amorphous soft magnetic material in this description is a soft magnetic material having an amorphous structure as the major structure. The amorphous structure does not have a clear peak in the X-ray diffraction pattern, and shows a broad halo pattern only. The heat-treated amorphous structure may form a nanocrystal structure, and a nanocrystal soft magnetic material having a nanocrystal structure shows diffraction peaks at the positions corresponding to the lattice spacing of the crystal face. The crystallite diameter can be calculated from the width of the diffraction peak by the Scherrer's equation.

Nanocrystal soft magnetic materials in this description include nanocrystals having the crystallite diameter calculated by the Scherrer's equation based on the half width of the diffraction peak of the X-ray diffraction that is less than 1 μm. In the present embodiment, the crystallite diameter of nanocrystals, which is calculated by the Scherrer's equation based on the half width of the diffraction peak of the X-ray diffraction, may be 100 nm or less and may be 50 nm or less. In some embodiments, the crystallite diameter of nanocrystals is 5 nm or more. Such a size of the crystallite diameter of nanocrystals improves the soft magnetic characteristics. Note here that conventional magnetic steel sheets have a crystallite diameter in the order of μm, typically 50 μm or more.

As is clear from reference examples described later, amorphous soft magnetic materials have tensile strength higher than that of nanocrystal soft magnetic materials. Amorphous soft magnetic materials have saturated magnetization lower than that of nanocrystal soft magnetic materials.

The inner bridges 36 and outer bridges 38 as the bridges of the rotor core 30 structurally have a low strength as stated above. The bridges of the present embodiment are strong because the bridges are made of an amorphous soft magnetic material that is stronger than the nanocrystal soft magnetic material. This suppresses damage at the bridges when the rotor rotates at a high speed, and so the durability of the rotor improves.

Amorphous soft magnetic materials have saturated magnetization lower than that of nanocrystal soft magnetic materials. Magnetic flux from a magnet therefore easily flows to the stator through the parts other than the bridges, and the output characteristics of the motor 1 improve.

As is also clear from Examples described later, during the driving of the motor 1, the stator 2 having the coil 7 wound therearound generates heat, and the generated heat heats the outer circumference of the rotor 3 (specifically the rotor core 30) as well. In such a case, the output of a conventional motor may decrease severely.

Considering such a case, the outer bridges 38 in some embodiments are made of an amorphous soft magnetic material. That is, when the outer bridges 38 are made of an amorphous soft magnetic material, the inner bridges 36 may be made of any one of an amorphous soft magnetic material and a nanocrystal soft magnetic material.

Amorphous soft magnetic materials decrease in saturated magnetic flux density more than nanocrystal soft magnetic materials with increase in temperature. This configuration of the motor therefore limits the flow of magnetic flux through the outer bridges 38 made of an amorphous soft magnetic material even when the temperature of the outer circumference of the rotor core 30 increases to a high-temperature range during the driving of the motor 1. The magnetic flux flows more at the parts other than the outer bridges 38 toward the stator 2. This suppresses a decrease in the output of the motor 1 even when the temperature of the rotor core 30 of the motor 1 reaches a high-temperature range.

2. Method for Manufacturing Motor 1

2-1. Process of Preparing Metal Foil Pieces

The method firstly prepares a metal foil piece 30a to make up the rotor core 30 of the rotor 3. The metal foil piece 30a is made of an amorphous soft magnetic material. The metal foil piece 30a has a shape corresponding to the rotor core 30 in a cross section orthogonal to the rotary axis of the rotor 3. Specifically the metal foil piece 30a is round, and has a plurality of through-holes 32a and 32b, including through-holes 32a to embed magnets 5.

The amorphous soft magnetic material may be prepared by mixing metal raw materials that are mixed to have the above-stated composition and melting the metal raw materials at a high temperature in a high-frequency melting furnace, for example, to be a homogeneous molten metal, and then quenching the molten metal. The quenching rate depends on the material, which may be about $10^{6\circ}$ C./sec, for example. The quenching rate is not limited especially as long as it forms the amorphous structure before crystallization. The method of the present embodiment forms the metal foil piece 30a by spraying the molten metal of the metal raw materials on a rotating cooled roll to prepare a metal foil belt of the amorphous soft magnetic material, and by press-forming the metal foil belt to have a shape corresponding to the rotor core 30. In this way, quenching of the molten metal enables the manufacturing of an amorphous-structured soft magnetic material before the crystallization. The metal foil piece 30a may have a thickness of 5 to 50 μm, and may have a thickness of 15 to 35 μm.

Figure 4:
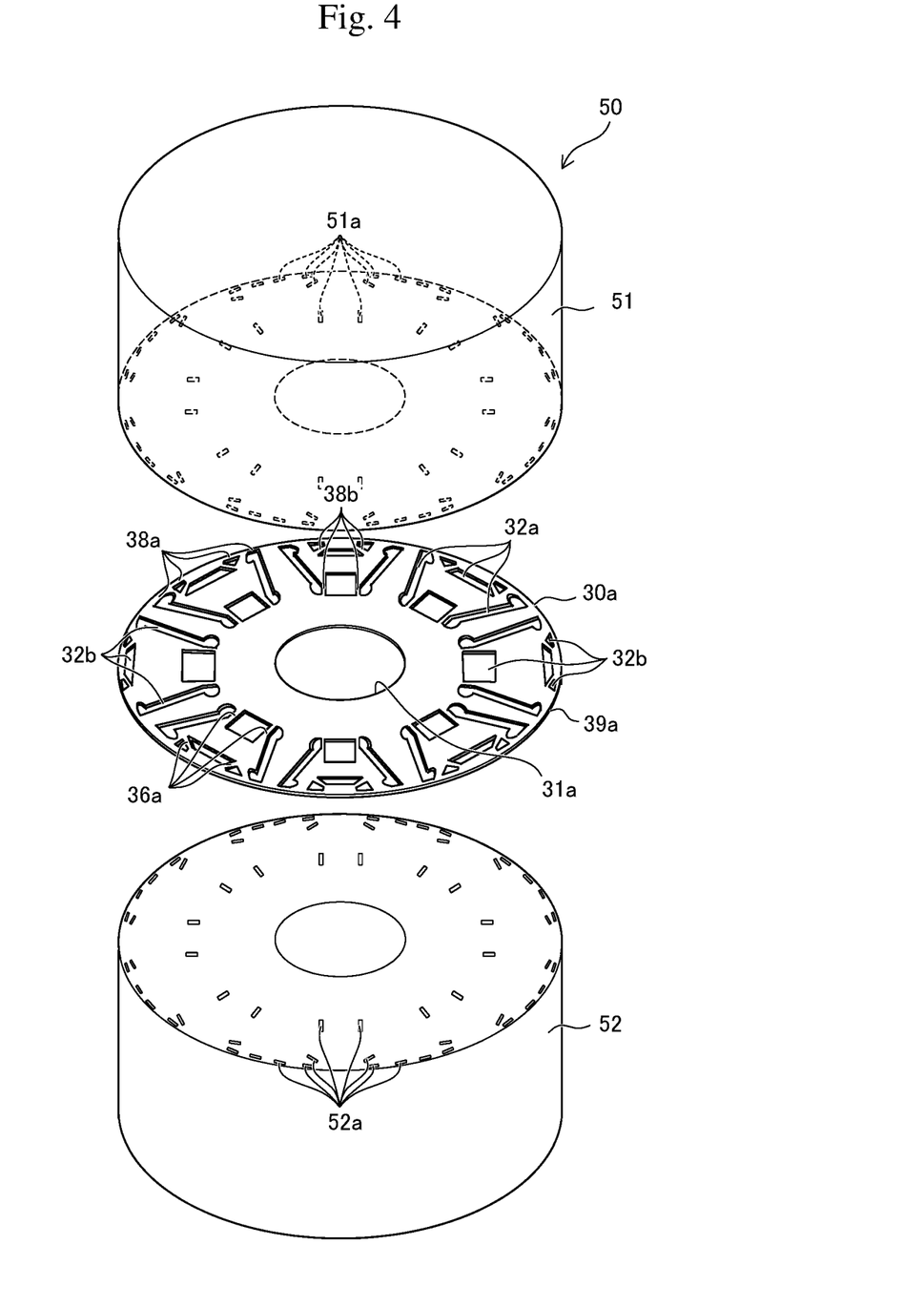
FIG. 4 is a schematic perspective view to explain the method for manufacturing the IPM motor in FIG. 1.

In this way, as shown in FIG. 4, the method forms a plurality of through-holes 32a and 32b in the round metal foil piece 30a. The through-holes 32a define the through holes 32A after stacking the pieces of the metal foil 30a, and are to embed the magnets 5. The through-holes 32b define the through-holes 32B after stacking the pieces of the metal foil 30a, and function as holes to block a magnetic flux path or to adjust a magnetic flux path. This defines the inner bridges 36a in the metal foil piece 30a that extend between the adjacent through-holes 32a, 32b. This also defines the outer bridges 38a between the through-holes 32a (32b) close to the outer circumference 39a of the metal foil piece 30a and the outer circumference 39a of the metal foil piece 30a.

2-2. Heat Treatment Process (Alteration Process)

Next the method performs heat treatment process. In this process, the method selects both of the bridges including the inner bridges 36a and the outer bridges 38a in the metal foil piece 30a, and heats parts other than the selected both of the bridges. This heating alters the heated parts (the parts other than the bridges) from the amorphous soft magnetic material to a nanocrystal soft magnetic material while keeping the selected bridges as the amorphous soft magnetic material. More specifically the amorphous structure of the soft magnetic material at the heated part alters to the nanocrystal structure.

Specifically as shown in FIG. 4, the method hot-presses the metal foil piece 30a between a pair of dies 50 including an upper die 51 and a lower die 52. The upper die 51 and the lower die 52 internally include a heater (not illustrated). The surfaces of the upper die 51 and the lower die 52 that come in contact with the metal foil piece 30a have recesses 51a and 52a, respectively, so that the inner bridges 36a and the outer bridges 38a do not come in contact with the dies during hot-pressing. The recesses 51a and 52a are slightly larger than the inner bridges 36a and the outer bridges 38a. These recesses can reduce heat transmission from the die 50 to the inner bridges 36a and the outer bridges 38a.

The conditions of the heat treatment of the metal foil piece 30a are not limited especially, and may be selected as needed while considering the composition of the metal raw materials or the magnetic property to be achieved. The conditions therefore are not limited especially, and the temperature of the heat treatment is higher than the crystallization temperature of the soft magnetic material. Such a heat treatment of the amorphous soft magnetic material alters the amorphous soft magnetic material to a nanocrystal soft magnetic material. In some embodiments, heat treatment is performed under an inert gas atmosphere.

The crystallization temperature causes crystallization of a material. Since crystallization involves an exothermic reaction, the crystallization temperature can be determined by measuring the temperature of heat generation involved in the crystallization. For instance, the crystallization temperature may be measured by differential scanning calorimetry (DSC) under the condition of a predetermined heating rate (e.g., 0.67 $Ks^{-1}$). The crystallization temperature depends on amorphous soft magnetic materials, which may range from 300 to 500° C., for example. Similarly the crystallization temperature of a nanocrystal soft magnetic material also can be measured by differential scanning calorimetry (DSC). Nanocrystal soft magnetic materials, which already have crystals, may be heated at the crystallization temperature or higher to cause further crystallization. The crystallization temperature depends on nanocrystal soft magnetic materials, which may range from 300 to 500° C., for example.

The temperature for heating in this process is not limited especially as long as it is the crystallization temperature or higher from the amorphous soft magnetic material to a nanocrystal soft magnetic material. The temperature may be 350° C. or higher, and may be 400° C. or higher in some embodiments. The temperature for heating at 400° C. or higher progresses the crystallization efficiently. The temperature for heating may be 600° C. or lower, and in some embodiments, the temperature may be 520° C. or lower. The temperature for heating at 520° C. or lower prevents excessive crystallization, and suppresses the generation of by-products (e.g., $Fe_2B$).

The duration for heating in the heat treatment process is not limited especially. In some embodiments, the duration is 1 second or longer and 10 minutes or shorter, and is 1 second or longer and 5 minutes or shorter.

Considering a significant decrease in output from the motor with increase in temperature of the rotor core as stated above, the metal foil 30a in some embodiments includes the outer bridges 38 made of an amorphous soft magnetic material. That is, when the outer bridges 38 are made of an amorphous soft magnetic material, the inner bridges 36 may be made of any one of an amorphous soft magnetic material and a nanocrystal soft magnetic material. In some embodiments, the inner bridges 36 close to the outer circumference among the plurality of inner bridges 36 are made of an amorphous soft magnetic material.

To manufacture the metal foil piece 30a having the outer bridges 38 made of an amorphous soft magnetic material and the inner bridges 36 made of a nanocrystal soft magnetic material, the method may select the outer bridges 38 only and alter the other parts to the nanocrystal soft magnetic material. More specifically the heat treatment process of the method selects the outer bridges 38 only and brings the parts other than the outer bridges into contact with the upper die 51 and the lower die 52 to alter the other parts from the amorphous soft magnetic material to the nanocrystal soft magnetic material.

The metal foil piece 30a obtained includes the outer bridges 38 made of the amorphous soft magnetic material, and this suppresses a decrease in the motor of the resultant motor 1 even when the temperature of the rotor core 30 at the outer circumference increases to a high-temperature range.

2-3. Process of Manufacturing Rotor Core

Figure 5:
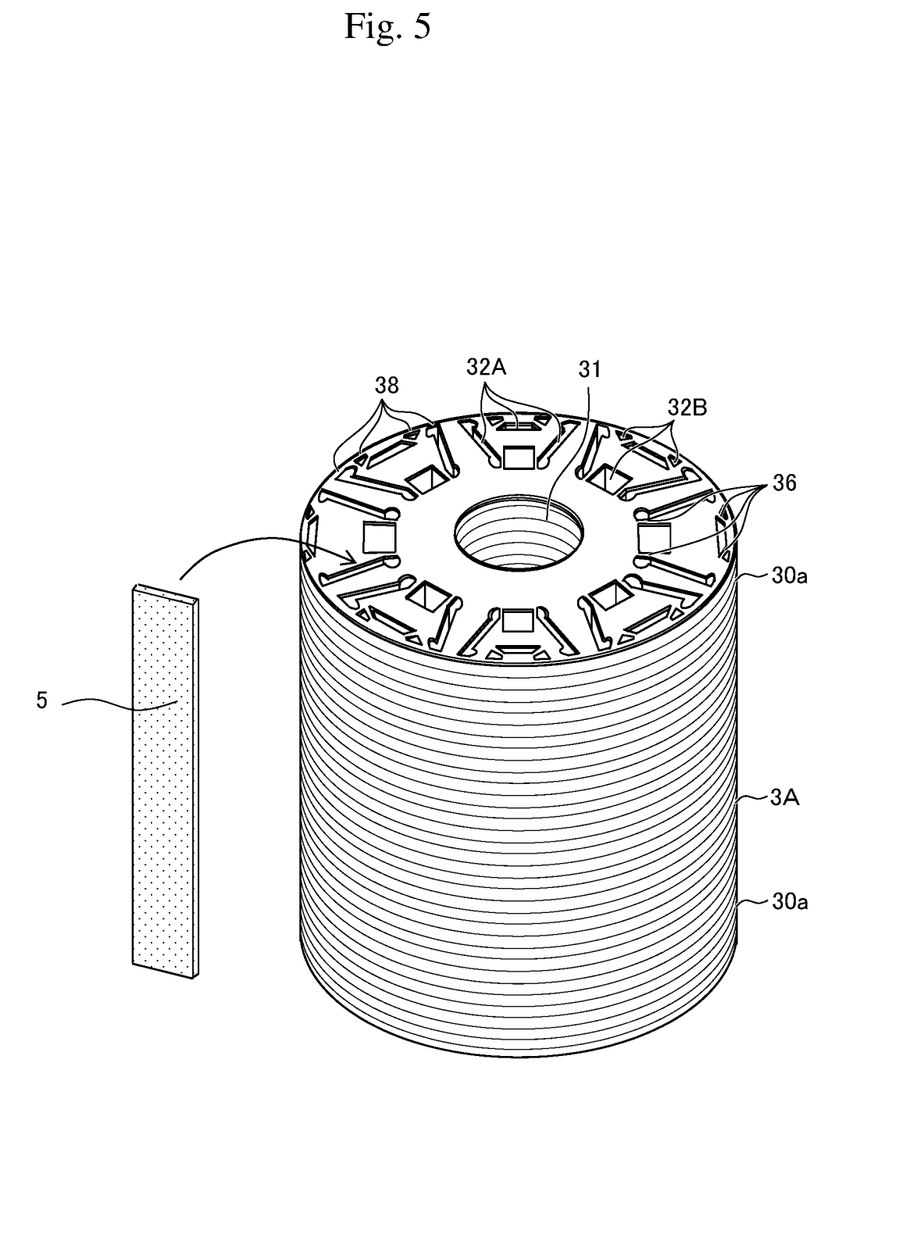
FIG. 5 is a schematic perspective view to explain the method for manufacturing the IPM motor in FIG. 1.

Next the method manufactures a rotor core. In this process, as shown in FIG. 5, the method stacks the metal foil pieces 30a altered in the heat treatment process in the direction of the rotation axis of the rotor 3, and embeds magnets 5 in the through-holes 32A. More specifically the method stacks the metal foil pieces 30a in accordance with the size of the rotor core 30 so that the through-holes 32A and 32B are formed in the direction of the rotation axis. To stack the metal foil pieces 30a, the method may bond the metal foil pieces 30a via the adhesive as stated above. Next the method inserts the magnets 5 in the through-holes 32A of the laminate 3A that is the stacked metal foil pieces 30a, and fills the through-holes 32A with resin.

Such a manufacturing method includes the heat treatment process to keep the bridges including the inner bridges 36 and the outer bridges 38 as an amorphous soft magnetic material that is stronger than a nanocrystal soft magnetic material, and so can improve the strength at the bridges.

The local heating alters parts other than the bridges into a nanocrystal soft magnetic material, and so can increase the strength of the bridges easily without plastic-deforming of the bridges. This avoids damage of the bridges, such as deformation, when the method stacks the metal foil pieces 30a or embeds the magnets 5 in the process of manufacturing the rotor core.

The rotor 3 manufactured by the method of the present embodiment suppresses a damage at the bridges when the rotor 3 rotates at a high speed, and so the durability of the rotor 3 improves. Amorphous soft magnetic materials have saturated magnetization lower than that of nanocrystal soft magnetic materials. Magnetic flux from a magnet therefore easily flows to the stator 2 through the parts other than the bridges, and the output characteristics of the motor 1 improve.

Reference Example 1

A molten metal including Fe and Ni as magnetic metals and B as a non-magnetic metal was prepared. This molten metal was quenched to manufacture an amorphous soft magnetic material having the composition of $Fe_{84}B_{13}Ni_3$.

Reference Example 2

The material of Reference Example 1 was heated to 503° C. to alter the amorphous soft magnetic material into a nanocrystal soft magnetic material.

Reference Example 3

A magnetic steel sheet of Fe-3 mass % Si was prepared.
Evaluation Test

Test samples were prepared by cutting the materials of Reference Examples 1 to 3 into a predetermined shape, and tensile test was conducted for these test samples. Table 1 shows the result. Test samples were prepared by cutting the materials of Reference Examples 1 to 3 into a predetermined shape, and saturated magnetization of these test samples was measured. Table 1 shows the result.

TABLE 1

|  | Materials | Tensile strength (MPa) | Saturated magnetization (T) |
| --- | --- | --- | --- |
| Reference Ex. 1 | Amorphous | 1861 | 1.6 |
| Reference Ex. 2 | Nanocrystal | 1530 | 1.8 |
| Reference Ex. 3 | Magnetic steel sheet | 550 | 1.96 |

[Results]

As shown in Table 1, the amorphous soft magnetic material of Reference Example 1 had tensile strength larger than those of the nanocrystal soft magnetic material of Reference Example 2 and the magnetic steel sheet of Reference Example 3. The amorphous soft magnetic material of Reference Example 1 had saturated magnetization smaller than those of the nanocrystal soft magnetic material of Reference Example 2 and the magnetic steel sheet of Reference Example 3. These results show that a rotor core including a part of the bridges made of an amorphous soft magnetic material will be stronger than a rotor core made of a nanocrystal soft magnetic material as stated above. A rotor core of an IPM motor is designed to flow less magnetic flux from a magnet through the bridges. The bridges made of an amorphous soft magnetic material of the rotor core allow the magnetic flux from a magnet to flow to the stator through the other parts efficiently, and so the output characteristics of the motor improve.

Example 1

Figure 6:
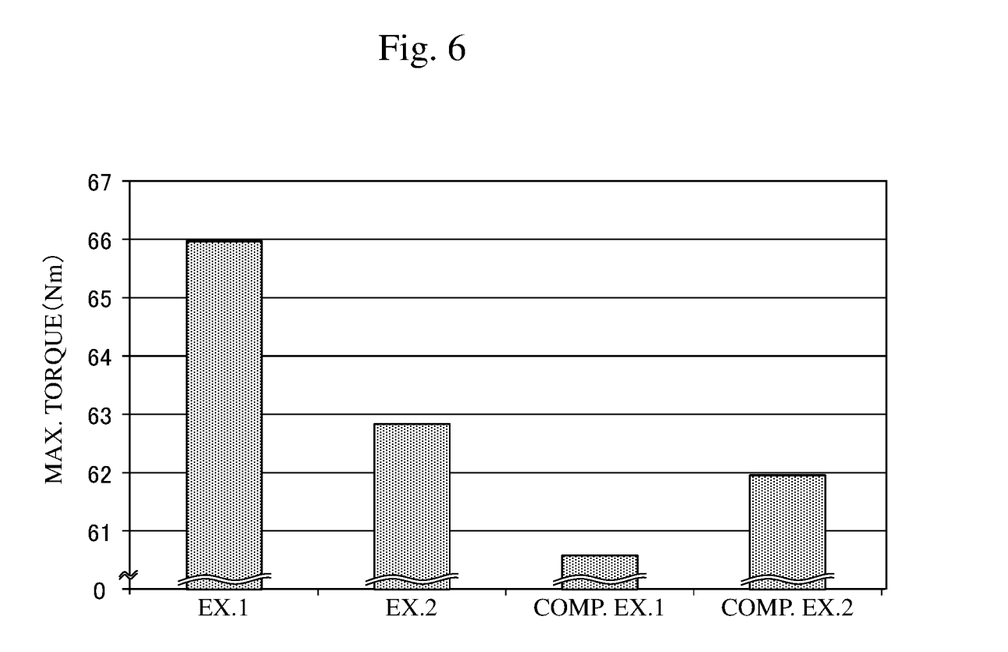
FIG. 6 is a graph showing the result of the output torques from the IPM motors according to the models of Examples 1 and 2 and Comparative Examples 1 and 2.

A model of the motor having the shape shown in FIG. 1 was manufactured. The rotor core had a diameter of 97.5 mm and a thickness of 59.5 mm. Among the inner bridges 36 of FIG. 2, the inner bridges close to the center had a width of 1.50 mm and the inner bridges 36 close to the outer circumference 39 had a width of 0.75 mm. Among the outer bridges 38, the outer bridge 38 between each through-hole 32B and the outer circumference 39 of the rotor core 30 had a width of 0.60 mm, and the outer bridge 38 between each through-hole 32A and the outer circumference 39 of the rotor core 30 had a width of 1.00 mm. All of the bridges of this model had the material characteristics of the amorphous soft magnetic material shown in Table 1, and the other parts had the material characteristics of the nanocrystal soft magnetic material shown in Table 1. The torque (maximum torque) of the motor of this model was analyzed. FIG. 6 and Table 2 show the result.

Example 2

Similarly to Example 1, a model of the motor having the shape shown in FIG. 1 was manufactured, and the torque of the motor was analyzed. This model was different from Example 1 in that the outer bridges 38 only had the material characteristics of the amorphous soft magnetic material. FIG. 6 and Table 2 show the result.

Example 3

Similarly to Example 1, a model of the motor having the shape shown in FIG. 1 was manufactured, and the torque of the motor was analyzed. This model was different from Example 1 in that the inner bridges 36 and the outer bridges 38 shown in FIG. 2 had narrow widths of about ⅓. Specifically among the inner bridges 36, the inner bridges 36 close to the center had a width of 0.50 mm and the inner bridges 36 close to the outer circumference 39 of the rotor core 30 had a width of 0.25 mm. Among the outer bridges 38, the outer bridge 38 between each through-hole 32B and the outer circumference 39 of the rotor core 30 had a width of 0.20 mm, and the outer bridge 38 between each through-hole 32A and the outer circumference 39 of the rotor core 30 had a width of 0.33 mm. Table 2 shows the result.

Comparative Example 1

Similarly to Example 1, a model of the motor having the shape shown in FIG. 1 was manufactured, and the torque of the motor was analyzed. This model was different from Example 1 in that all of the parts including the inner bridges and the outer bridges had the material characteristics of the magnetic steel sheet shown in Table 1. FIG. 6 and Table 2 show the result.

Comparative Example 2

Similarly to Example 1, a model of the motor having the shape shown in FIG. 1 was manufactured, and the torque of the motor was analyzed. This model was different from Example 1 in that all of the parts including the inner bridges and the outer bridges had the material characteristics of the nanocrystal soft magnetic material shown in Table 1. FIG. 6 and Table 2 show the result.

TABLE 2

| | Inner bridge | Outer bridge | Other parts | Torque (Nm) |
|---|---|---|---|---|
| Ex. 1 | Amorphous | Amorphous | Nanocrystal | 65.97 |
| Ex. 2 | Nanocrystal | Amorphous | Nanocrystal | 62.85 |
| Ex. 3 | Amorphous | Amorphous | Nanocrystal | 76.45 |
| Comp. Ex. 1 | Magnetic steel sheet | Magnetic steel sheet | Magnetic steel sheet | 60.58 |
| Comp. Ex. 2 | Nanocrystal | Nanocrystal | Nanocrystal | 61.97 |

As shown in Table 2 and FIG. 6, the motors of Examples 1 to 3 had the torques larger than those of Comparative Examples 1 and 2. Presumably this is because the bridges of Examples 1 to 3 were made of the amorphous soft magnetic material, and so the magnetic flux from a magnet flowed to the stator through the other parts efficiently, and so the output characteristics of the motor improved. Especially Example 3 having narrow widths of the bridges caused saturation of the magnetic flux at the bridges when the motor was driven, and so presumably the magnetic flux from the magnet flowed through the other parts to the stator efficiently.

Example 4

Figure 7:
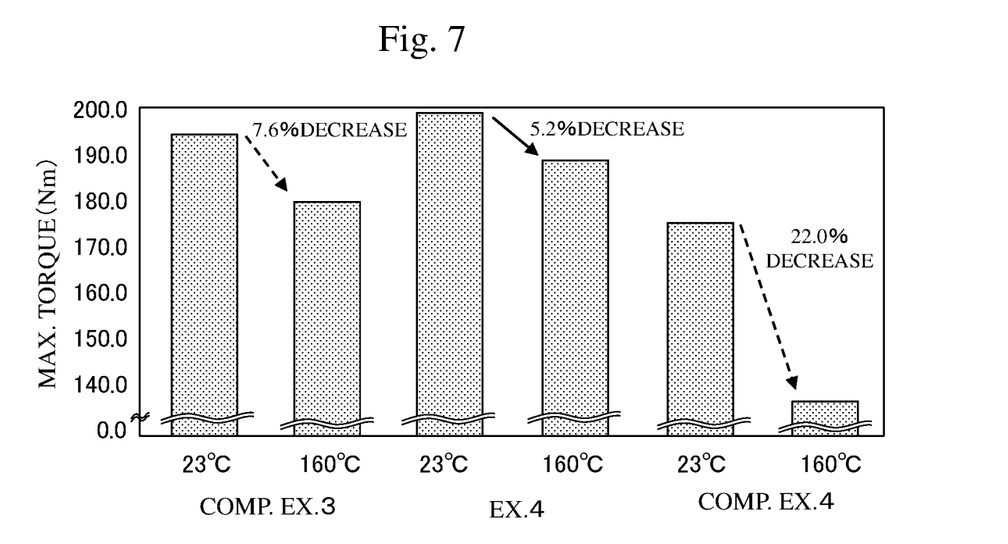
FIG. 7 is a graph showing the result of the maximum torques at 23° C. and 160° C. of the IPM motors according to the models of Example 4 and Comparative Examples 3 and 4.
Figure 8A:
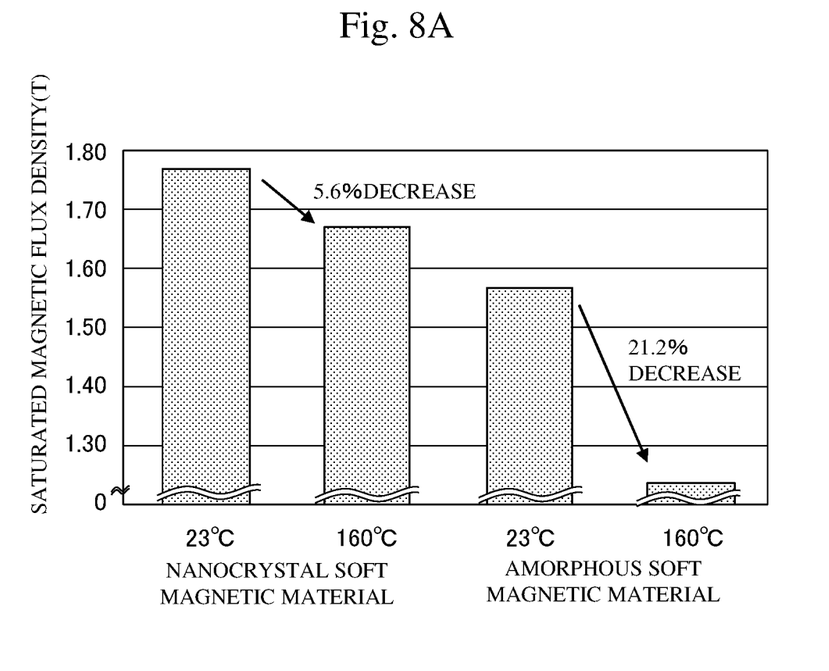
FIG. 8A is a graph showing the saturated magnetic flux density of a nanocrystal soft magnetic material and of an amorphous soft magnetic material at 23° C. and 160° C.
Figure 8B:
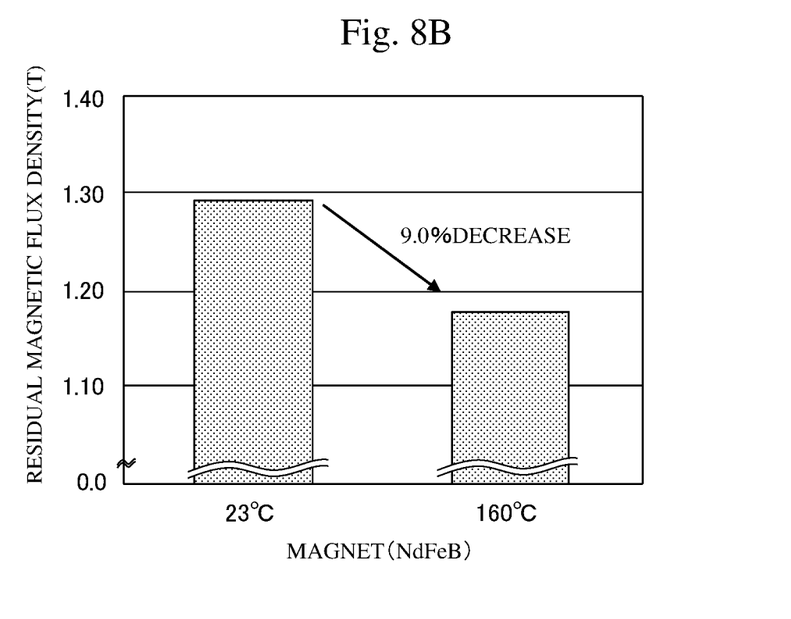
FIG. 8B is a graph showing the residual magnetic flux density of a magnet at 23° C. and 160° C.

Similarly to Example 1, a model of the motor having the shape shown in FIG. 1 was manufactured, and the torque of the motor was analyzed. This model was different from Example 1 in that a motor having larger dimensions (size) was assumed, and the motor had a larger output than that of the motor of Example 1. Similarly to Example 1, this Example 4 also included the inner bridges and the outer bridges made of the amorphous soft magnetic material, and parts other than the bridges were made of the nanocrystal soft magnetic material. The maximum torque of the motor was analyzed when the rotor core at 23° C. and 160° C. FIG. 7 shows the result. As shown in FIG. 8A and FIG. 8B, this analysis was made using the saturated magnetic flux density and the residual magnetic flux density of the nanocrystal soft magnetic material and the amorphous soft magnetic material at 23° C. and 160° C. as the values of physical property.

Comparative Example 3

Similarly to Example 4, a model of the motor having the shape shown in FIG. 1 was manufactured, and the torque of the motor was analyzed. This model was different from Example 4 in that the inner bridges and the outer bridges were made of the nanocrystal soft magnetic material, and the other parts also were made of the nanocrystal soft magnetic material. Comparative Example 3 therefore analyzed the maximum torque of the motor when the rotor core made of the nanocrystal soft magnetic material was at 23° C. and 160° C. FIG. 7 shows the result.

Comparative Example 4

Similarly to Example 4, a model of the motor having the shape shown in FIG. 1 was manufactured, and the torque of the motor was analyzed. This model was different from Example 4 in that the inner bridges and the outer bridges were made of the amorphous soft magnetic material, and the other parts also were made of the amorphous soft magnetic material. Comparative Example 4 therefore analyzed the maximum torque of the motor when the rotor core made of the amorphous soft magnetic material was at 23° C. and 160° C. FIG. 7 shows the result.

As shown in FIG. 7, the motor of Example 4 had a small decrease in maximum torque with increase in temperature than those of Comparative Example 3 and Comparative Example 4. The reason for this is as follows. As shown in FIG. 8A, amorphous soft magnetic materials decrease in saturated magnetic flux density more than nanocrystal soft magnetic materials with increase in temperature. Example 4 limited the flow of magnetic flux through the outer bridges made of the amorphous soft magnetic material even when the temperature of the outer circumference of the rotor core increased to a high-temperature range during the driving of the motor. The magnetic flux flowed more at the parts other than the outer bridges toward the stator. Presumably this suppressed a decrease in the maximum output of the motor when the temperature of the rotor core reached a high-temperature range.

On the contrary, the rotor core of Comparative Example 4 was made of the amorphous soft magnetic material, and this rotor core limited the flow of magnetic flux to the stator at a high-temperature range. Presumably this caused a significant decrease in the maximum torque of the motor 1 of Comparative Example 4 at a high-temperature range. The rotor core of Comparative Example 3 was made of the nanocrystal soft magnetic material, and this rotor core of Comparative Example 3 therefore did not limit the flow of magnetic flux to the stator at a high-temperature range as much as in Comparative Example 4. A decrease of the saturated magnetic flux density, however, was small at the outer bridges of Comparative Example 3, and the magnetic flux easily flowed through this part as well. Presumably this decreased the maximum torque of Comparative Example 3 with increase in temperature as compared with Example 4.

The present inventors further confirmed that another model of Example 4 including the outer bridges made of an amorphous soft magnetic material and the inner bridges made of a nanocrystal soft magnetic material also suppressed a decrease in maximum torque of the motor as compared with Comparative Examples 3 and 4 as shown in Example 4.

That is a detailed description of one embodiment of the present disclosure. The present disclosure is not limited to the above-stated embodiment, and the design may be modified variously without departing from the spirits of the present disclosure defined in the attached claims.

In the present embodiment and Examples, at least the outer bridges are made of an amorphous soft magnetic material. In another example, the inner bridges only may be made of an amorphous soft magnetic material.

What is claimed is:

1. An interior permanent-magnet motor comprising: a stator having a coil wound therearound, and a rotor rotatably disposed inside of the stator, wherein
   the rotor includes a rotor core that is a laminate of a plurality of pieces of metal foil made of a soft magnetic material that are stacked in a direction of a rotation axis of the rotor,
   the rotor core has a plurality of through-holes that penetrates through the rotor core in the direction of the rotation axis, the plurality of through-holes including through-holes embedding magnets,
   the rotor core has inner bridges and outer bridges, the inner bridges extending between the through-holes that are adjacent to each other, the outer bridges being located between the through-holes close to an outer circumference of the rotor core and the outer circumference of the rotor core, and
   at least one of the inner bridges and the outer bridges in the rotor core includes an amorphous soft magnetic material, and the other parts of the rotor core include a nanocrystal soft magnetic material.

2. The interior permanent-magnet motor according to claim 1, wherein the outer bridges include an amorphous soft magnetic material.

3. A method for manufacturing an interior permanent-magnet motor including: a stator having a coil wound therearound, and a rotor rotatably disposed inside of the stator, the method comprising:
   preparing metal foil pieces each made of an amorphous soft magnetic material and having a shape corresponding to a shape of a rotor core of the rotor, the metal foil piece having a plurality of through holes including through-holes to embed magnets;
   selecting at least one of inner bridges and outer bridges from each of the prepared metal foil pieces, the inner bridges extending between the through-holes that are adjacent to each other, the outer bridges being located between the through-holes close to an outer circumference of the metal foil piece and the outer circumference of the metal foil piece, and heating parts other than the selected bridges to alter the heated parts from the amorphous soft magnetic material to a nanocrystal soft magnetic material while keeping the selected bridges as the amorphous soft magnetic material; and
   stacking the altered metal foil pieces in a direction of a rotation axis of the rotor, and embedding magnets in the corresponding through-holes to manufacture the rotor core.

4. The method for manufacturing an interior permanent-magnet motor according to claim 3, wherein the selected bridges for altering include the outer bridges.

5. The interior permanent-magnet motor according to claim 1, wherein the nanocrystal soft magnetic material has a crystallite diameter that is less than 1 μm.

6. The method for manufacturing an interior permanent-magnet motor according to claim 3, wherein the nanocrystal soft magnetic material has a crystallite diameter that is less than 1 μm.

* * * * *